July 10, 1956
F. E. NULL
2,754,061
AUTOMATIC TEMPERATURE REGULATOR FOR MIXING LIQUIDS
Filed Dec. 11, 1953
2 Sheets-Sheet 1
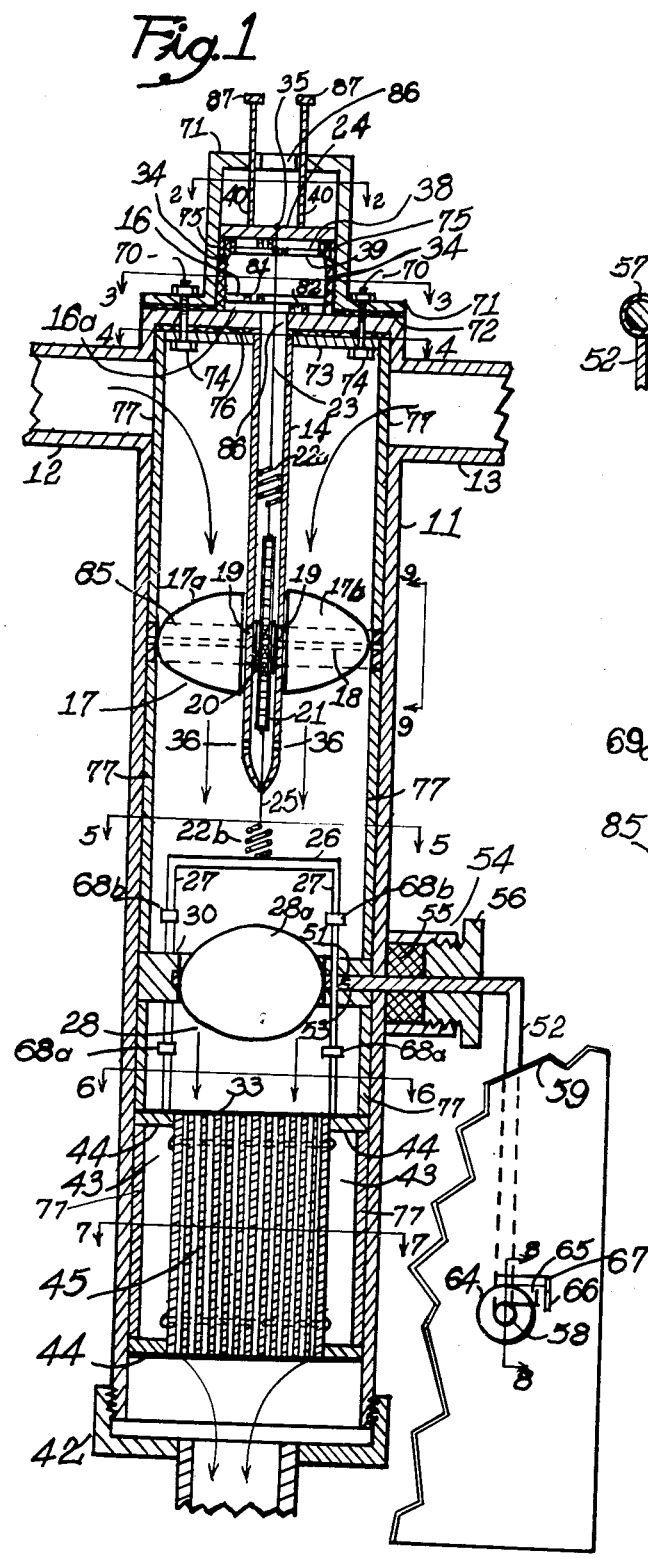
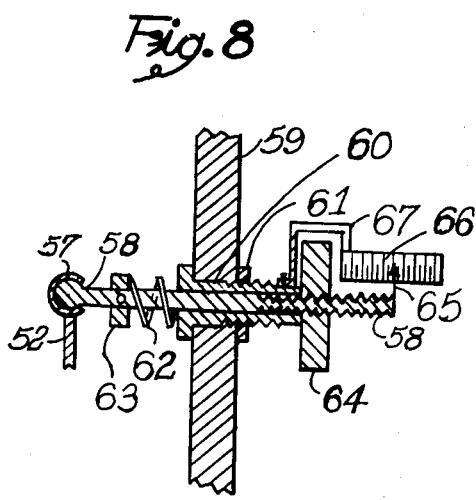
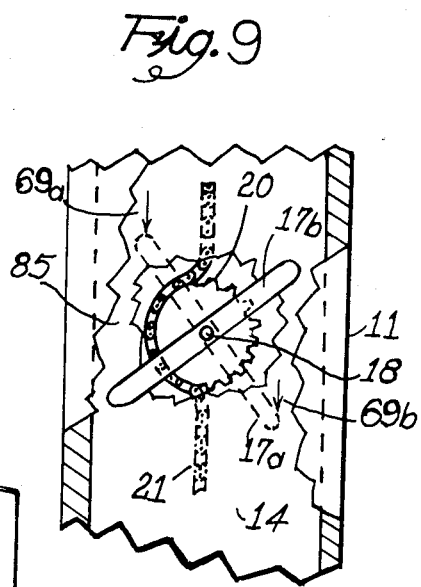
INVENTOR.
F. E. Null.

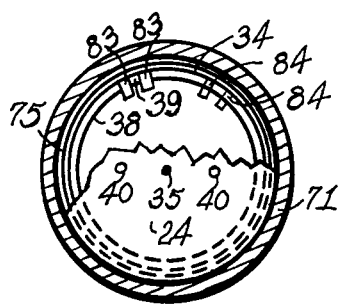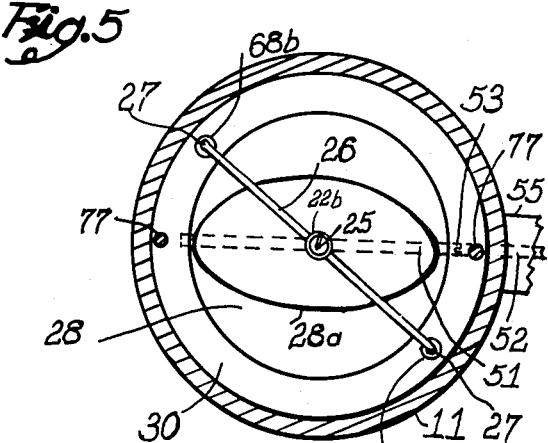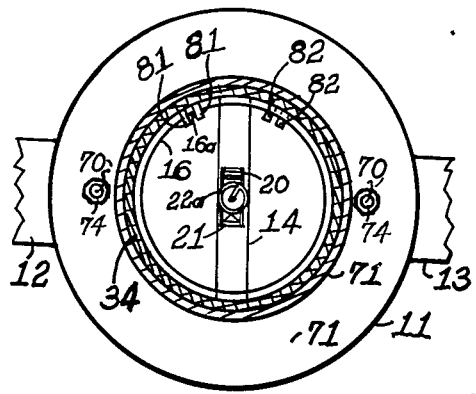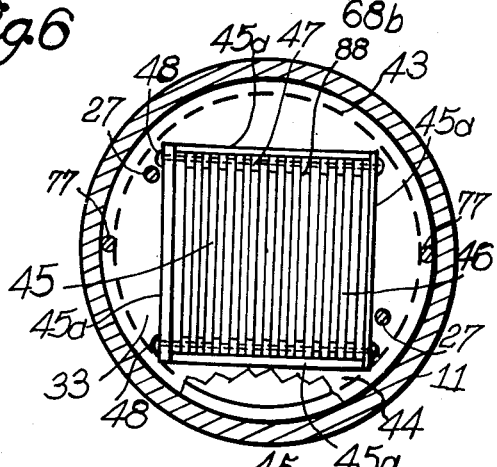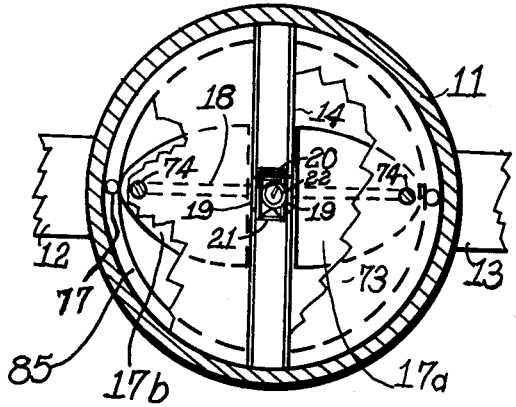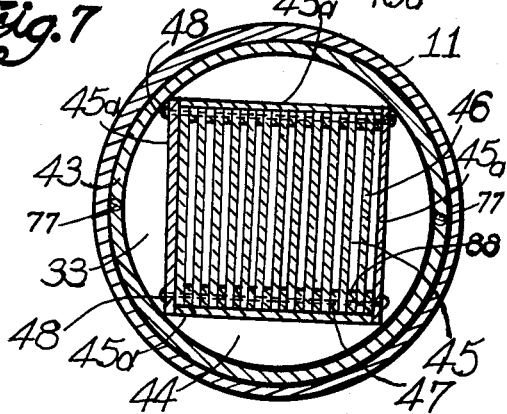

United States Patent Office 2,754,061
Patented July 10, 1956

2,754,061
AUTOMATIC TEMPERATURE REGULATOR FOR MIXING LIQUIDS

Fay E. Null, Beavercreek Township, Greene County, Ohio

Application December 11, 1953, Serial No. 397,660

6 Claims. (Cl. 236—12)

This invention relates to a temperature regulator for a stream of liquid that will react rapidly to prevent an appreciable temperature change. An application of the present invention would be to control the relative amounts of hot and cold water supplied to the mixer nozzle of the bathroom shower so as to maintain the shower water at the desired fixed temperature. In many plumbing installations the hot and cold water supply lines can not be economically made large enough to prevent a fluctuation in pressure when other outlets are opened or closed, e. g., the hot water supply to an automatic washing machine, or the cold water supply to the garden hose. These pressure changes occur at random and change the temperature of the shower in a very irritating and often dangerous manner. An automatic regulator is needed to keep the temperature of the shower constant regardless of pressure changes and possible changes in the cold and hot water supply lines.

If the temperatures and pressures of the hot and cold water supply lines have average values when the shower is first turned on, such a regulator should allow the desired temperature to be quickly attained by turning the cold and hot water faucets on approximately the same amount as previously gave the desired temperature as determined by the temperature control setting, e. g., both faucets fully open. The regulator should have sufficient adjustment to obtain the desired temperature even with the hot and cold water faucets turned on by widely different amounts.

More specifically this invention relates to the rapid automatic regulation of the temperature of a stream of liquid subject to temperature variation, by utilization of the variation in the force exerted on a piston composed of a multiplicity of parallel surfaces with a small clearance between them for viscous fluid flow. The viscosity coefficient of nearly all liquids has an appreciable decrease with rise in temperature, and the corresponding change in force on a piston of the above type, may be used to actuate control devices such as reactors in series with heating coils and valves regulating the rate of fluid flow.

In one embodiment of the present invention described in the following specification the regulator controls the relative flow of hot and cold water to a mixer faucet so that the fluid flow to a shower, tub, or other container is kept at a desired set temperature. The pull of a piston of the above type, hereafter referred to as a viscosity piston, is balanced for a given temperature against the pull of a reference piston by a variable aperture in series with the viscosity piston. The variable aperture produces turbulence that causes a pressure drop across it which is a function of the square of the velocity of flow through the aperture.

The same volume of liquid flows through the variable aperture and viscosity piston in series, and the pressure drops across said variable aperture and piston are added directly to give a combined pressure drop, hereafter designated as the reference pressure drop. Thus an increase in pressure drop across the aperture decreases the pressure drop across the viscosity piston, and vice versa. For a given supply pressure and setting of the variable aperture an increase in temperature decreases the coefficient of viscosity of the liquid and decreases the pressure drop across the viscosity piston compared to that across the aperture. A decrease in temperature of the liquid causes an increase in the coefficient of viscosity of the liquid with a corresponding increase in the pressure drop across the viscosity piston relative to that across the aperture. The rate of flow (volume of liquid passed per second) is inversely proportional to the sum of the resistance (to flow) of the aperture and viscosity piston. Thus, if the resistances are both increased by the same amount (aperture smaller and viscosity coefficient greater), the rate of flow will be decreased, but the relative pressure drops across the aperture and viscosity piston will remain unchanged. If the aperture resistance is increased by the same amount that the resistance of the viscosity piston is decreased, the rate of flow will be unchanged, but less of the reference pressure will be across the viscosity piston.

Variations in line pressure at constant temperature affect both the viscosity and reference pistons equally and their effects cancel, but variations in the temperature of the mixed hot and cold fluid flow upsets this balance and varies the setting of the vane valves controlling the relative flow of hot and cold water to the mixer faucet nozzle until the reference temperature is restored.

In this embodiment of the invention a chain connection between the viscosity and reference pistons engages a sprocket pulley connected to the vane valves that control the relative flow of the hot and cold water channels. The invention is not, however, limited to this application as said connection between the reference and viscosity pistons could equally well control a reactor in series with a heating coil in the hot water channel.

It is, therefore, among the objects of the present invention to provide a temperature regulator of a liquid flow that will exert a force of the order of pounds for a temperature error in a stream of fluid of 10 degrees Fahrenheit so that the light, rotary type, vane valves may react to correct the relative flow in hot and cold water channels to bring back the desired temperature in the mixed stream in a few hundredths of a second.

Another object of the present invention is to provide sufficient surface area and mass of closely spaced surfaces in a viscosity piston to prevent excessive change in temperature of the exit liquid in the few hundredths of a second required to correct the relative flow of hot and cold water.

Another object of the present invention is to provide a temperature regulator for a liquid flow whose calibration is not changed by pressure changes in either or both the cold and hot water supply lines.

Another object of the present invention is to provide a temperature regulator for a fluid flow that may be conveniently placed back of the tile of a bathroom wall, with the temperature adjustment on the bathroom side consisting simply of a thumb screw, pointer rod, and scale.

Another object of the present invention is to provide a temperature regulator for a fluid flow that is constructed of simple, inexpensive parts that do not require close tolerance.

Another object of the present invention is to provide a temperature regulator for a fluid flow that gives a relatively large difference in the proportion of hot and cold water admitted for a small displacement of moving parts.

Objects and advantages other than those above set forth will be apparent to those skilled in the art from the following description when read in connection with the accompanying drawings, in which:

Fig. 1 shows the temperature adjustment control setting on the side of a bathroom wall with the wall broken away to show a vertical section of the main portion of the regulator.

Fig. 2 is a horizontal section along the line 2—2 in Fig. 1 to show the reference piston and its stops, and with part of the piston broken away to show a rubber sleeve held against a lower rim on the piston by a ring clamp.

Fig. 3 is a horizontal section along the line 3—3 in Fig. 1 to further illustrate the sleeve connection between the reference piston and the lower end of its cylinder, and the top of the hollow partition between the hot and cold water channels.

Fig. 4 is a horizontal section along the line 4—4 in Fig. 1, with portions of the plate support of the partition between the hot and cold water channels broken away to indicate the mounting of the vane valves that control the relative flow of hot and cold water.

Fig. 5 is a horizontal section along the line 5—5 in Fig. 1 that shows the variable aperture vane that acts as a ballast pressure drop in series with the viscosity piston, and the top of the brace rod and rod attachments from the reference piston passing below the aperture vane to the viscosity piston.

Fig. 6 is a horizontal section along the line 6—6 in Fig. 1 to illustrate the top of the viscosity piston and its attached guide rods.

Fig. 7 is a horizontal section along the line 7—7 in Fig. 1 to indicate the internal construction of the viscosity piston.

Fig. 8 is a vertical section along the line 8—8 in Fig. 1 to illustrate the construction of the temperature setting elements.

Fig. 9 is a fragmentary elevation view along the line 9—9 in Fig. 1 with part of the case wall broken away to show the angular relation between the vane valves in the hot and cold water channels.

Referring more particularly to the drawings by characters of reference, reference numeral 11 is the cylindrical case of the regulator with cold water inlet 12, and hot water inlet 13. The hollow partition 14 separates the cold and hot water flow and is supported from the plate 73 which is held by bolts 74 against the rubber gasket 76 which is pressed against the top of the case 11, the bolts 74 being also used to clamp the flange on the bottom of cylinder 71 against the rubber gasket 72. The valves 17 have vanes 17a and 17b mounted on axle 18 which rotates in bearings 19 in the walls of the partition 14 with its ends supported in ring 85 which is connected by support rods 77 to the plate 73 at the top and to the ring 30 below. The vanes 17a and 17b being at right angles to each other as shown in Fig. 9 so that rotation of axle 18 causes one vane to close by the same amount that the other opens. The sprocket wheel 20 is mounted on axle 18, and is rotated by sprocket chain 21 attached at the top to spring 22a and wire 23 to reference piston 24, while the bottom of chain 21 is connected by wire 25 through a small opening in the bottom of partition 14 to spring 22b which connects to the brace bar 26 and rods 27 that straddle the variable vane 28a of the variable aperture 28 by extending through the variable aperture mounting ring 30, to the top of the viscosity piston 33. Thus, if the force on the viscosity piston is the greater the sprocket chain 21 is pulled downward rotating vanes 17a and 17b of valve 17 in such a direction as to decrease the flow of cold water and increase that of the hot water, and vice versa if the force on the reference piston is the greater.

The reference pressure piston 24 is connected by the flexible artificial rubber sleeve 34, see Figs. 1, 2, and 3, to the bottom inner surface of the cylinder 71 by clamp rings 16 and 16a which are compressed by pliers on the tabs 81 for the upper ring and 82 for the lower ring so as to fit the inside of the rubber sleeve 34 and when released provide a strong clamp to hold rubber sleeve 34 at the bottom of cylinder 71. This provides a reference piston without leakage that only has to make a sliding fit with the inner surface of the cylinder 71. The holes 36 in partition 14 allow access of water, at the pressure of the liquid before incidence upon the variable aperture 28 and viscosity piston 33, to the interior of partition 14 and hence to react on the reference piston 24. Holes 36 are placed where the liquid flow is parallel to the partition 14 so that the flow momentum does not produce aspiration or ram action and the pressure inside the holes 36 is the same as that on the outside. Thus, regardless of fluctuations in pressure in the cold and hot water supply lines the same pressure head will be exerted on piston 24 as the combined head upon the variable aperture 28 and viscosity piston 33. The reference piston 24 is limited in its upward motion by contact with the top of cylinder 71, and in its downward motion by the stops 87 on the upper ends of rods 40 which slide through openings in the top of cylinder 71 and prevent lateral turning of piston 24 with possible twist in wire 23 and misalignment of sprocket chain 21 with sprocket wheel 20.

The viscosity piston 33 consists of a cylindrical outer shell 43 split to slide along support rods 77, see Figs. 1 and 7, and having a loose, sliding fit with the wall of case 11. Top and bottom plates 44 have holes for a slide fit on rods 77 and support a hollow prism 45 with a square, horizontal cross section with sides 45a making a press fit in plates 44 and cylindrical shell 43. The left side of sides 45a of prism 45 is removable, and alternate thin sheets 46 and spacers 47 with punched holes at the ends are stacked on rods 48, the left side piece 45a then being put on top, and the ends of rods 48 riveted down to form a rigid prism 45. The rigid prism 45 is then press fitted into the top and bottom plates 44 which are attached to the top and bottom of shell 43. The viscosity prism thus contains a multiplicity of thin metal sheets with small clearance for water flow between them. The viscosity piston has upward projecting rods 27, see Figs. 1 and 6, attached to the top cover plate 44 that slide through openings in the support ring 30 with stops 68a and 68b to limit the piston displacement.

As the temperature of the mixed stream of hot and cold water incident on the viscosity piston 33 increases, the coefficient of viscosity is decreased and the pressure drop across the viscosity piston is decreased, relative to that across the aperture, and the viscosity piston has a smaller fraction of the reference pressure across it.

The variable aperture 28, see Figs. 1 and 5, may be adjusted for maximum change in pressure on the viscosity piston for a given change in water temperature, which occurs for the drop in pressure across the variable aperture equal to that across the viscosity piston. The variable aperture 28 is adjusted by rotation of the vane 28a which is mounted on axle 51. Axle 51 is rotated by rod 52 which is connected to 51 by keyed joint 53 after the ring 30 carrying the axle 51 has been positioned in the case 11, rod 52 being introduced through the stuffing gland 54 with packing 55, and screw-in plug 56. The lower end of rod 52 is attached by a pin and eyelet connection 57, see Fig. 8, to rod 58 which passes through bathroom wall 59 with a sliding fit in grommet 60 held in place by nut 61. Knurled nut 64 engages the threaded end of rod 58 and is held against the end of grommet 60 by the pressure of spring 62 on the collar 63. Movement of the nut 64 thus adjusts the position of vane 28a of variable aperture 28. A pointer 65 on the end of rod 58 indicates the position of the vane 28a on the scale 66 which is held by the bracket 67 that is supported from grommet 60.

When the cold and hot water are turned off the springs 22a and 22b pull the reference piston 24 down until the stops 87 on rods 40 contact the top of cylinder 71, and the viscosity piston 33 is pulled up until stops 68a contact the support ring 30, the sprocket chain 21 still being held on the sprocket wheel 20 by the spring tension. When hot and hold water are turned on the tension of springs 22a and 22b is sufficient to prevent separation (for maximum water pressure on the reference piston 24 and the viscosity piston 33) by a greater distance than that between the median position of piston 24 between its upper and lower stop positions and the median position of the viscosity piston determined by the stops 68a and 68b. With the pistons 24 and 33 in their median positions the vanes 17a and 17b of the valves 17 of Fig. 9 are in the 45 degree position, each being half closed. The distance from a median position of a piston to its extreme up or down position is sufficient to rotate sprocket wheel 20 and vanes 17 to completely close one water channel and open the other. The size of the reference piston 24 is designed so that the forces on the reference piston 24 and viscosity piston 33 are balanced at the mean shower temperature when approximately half of the pressure at opening 36 in partition 14 is dropped across the aperture 28, and the other half across the viscosity piston 33 as determined by the temperature control setting of aperture 28 by the position of pointer 65 on scale 66. It is assumed that the entire pressure head at openings 36 is expanded across the variable aperture 28 and viscosity piston 33, the pressure drop across the opening in end cap 42 and the exit nozzle being negligible by comparison. The area of reference piston is only one half that of the viscosity piston but the reference pressure at openings 36, the force acting on unit area, gives the force on the reference piston as $F_R$=Pressure Head at "36"×Area of Reference Piston, equals the force on the viscosity piston $F\eta$=(Pressure at "36"/2)×Area Viscosity Piston=(Pressure Head at "36"/2)×2×Area Reference Piston=Pressure Head at "36"×Area Reference Piston. The system comprised by the piston 24, valves 17, and piston 33 will then be in equilibrium at the postion of valve 17 that produces the mean shower temperature.

If a higher shower temperature is desired the valves 17 must be rotated counterclockwise, see Fig. 9, so as to increase the flow of hot water past vane 17b and decrease that of the cold water past vane 17a. The viscosity piston 33 must now have the greater pressure and this is accomplished by decreasing the fraction of the total reference pressure drop at holes 36 that is across the variable aperture 28, by rotating vane 28a into a more open position, e. g., by turning nut 64 to allow pointer 65 to move in under the expansion of spring 62. The viscosity piston now moves down rotating valves 17 in the counterclockwise direction in Fig. 9 and allowing relatively more hot than cold water to flow past valves 17 than before. This motion continues until the temperature of the water has been raised enough to lower the coefficient of viscosity of the water to decrease the pressure drop on the viscosity piston relative to the pressure drop on the variable aperture 28 until one half of the reference pressure head at "36" is again on the viscosity piston so that equilibrium is again established, with the forces on the reference piston 24 and viscosity piston 33 again equal. The force on the viscosity piston is now the same as before the change in setting, corresponding to a lowered coefficient of viscosity but a greater total flow, and the same pressure drop must therefore exist across the variable aperture as before the setting change, but is now produced by the product of a larger flow through a smaller resistance, larger variable aperture opening.

Thus, any desired shower temperature can be obtained between the temperatures of the hot and cold water by obtaining equilibrium of the forces acting on the reference piston 24 and on the viscosity piston 33 by keeping the pressure head on the variable aperture 28 constant but equal to the product of different opening resistances and flow rates, the higher flow rates through the viscosity piston 33 corresponding to the higher water temperatures, and correspondingly smaller opening resistance of a larger variable aperture 28.

If a pressure change had not been balanced out by a reference piston, but the viscosity piston had been balanced for one pressure and temperature, say by a spring, then a change in pressure would upset the position of the viscosity piston 33 and valves 17 without a temperature change so that equilibrium could not be established at the same temperature as before the pressure change.

The force on piston 24 is used as a reference to balance against the force on the viscosity piston 33 rather than a spring since a change of pressure (for a fixed temperature of the mixed flow) affects both the pistons 24 and 33 equally so that pressure change effects balance out. This follows since the fraction of the reference pressure head across the viscosity piston does not change for a fixed setting of the variable aperture 28 at a constant temperature of mixed flow. Thus, a change in pressure of both the cold water line and the hot water line by the same amount does not cause the viscosity piston to move, since the temperature of the water incident upon the viscosity piston is the same and the change in pressure on both pistons is equal. A decrease in pressure of the hot water line by the drain of additional faucets as to an automatic washing machine causes a decrease in temperature of the water incident upon the viscosity piston and the coefficient of viscosity automatically increases so that the force on the viscosity piston becomes greater than that of the reference piston and the valves 17 are turned counterclockwise in Fig. 9 to give an increase in the flow of the hot water relative to that of the cold until the equilibrium temperature is again reached at the former temperature of the mixed flow before the change in pressure occurred.

The viscosity piston has a quick response to change in temperature of the water flowing through it since the viscosity change is inherent in the liquid itself and does not depend upon the transfer of heat to some detector which must be heated up before detection can occur. The valves 17 have the momentum forces of flow as at 69a and 69b in Fig. 9 substantially balanced about axle 18 so that the torques required to rotate the valves 17 are very much smaller than the downward thrust on axle 18 due to the deflection of the water stream past the vanes 17a and 17b. Since the change in the coefficient of viscosity of water is about 9 percent for each 10 degrees Fahrenheit change in temperature and half of the reference water pressure head at "36" is normally across the viscosity piston, the change in pressure on the viscosity piston for a 10 degree Fahrenheit change in temperature is of the order of pounds per square inch. For a 50 pound per square inch water main, 25 pounds per square inch would be the average pressure on the viscosity piston, and a 9 percent change, would for the same flow, produce a force of 0.09×25=2.25 pounds per square inch. The flow resistance considered is divided between the aperture and viscosity piston (initially equal), and if the aperture resistance were constant the change in total resistance due to a 9 percent increase in the viscosity piston resistance would be 4.5 percent, but the aperture flow resistance decreases with velocity decrease,[1] thus causing the viscosity piston to take an additional increment of the pressure drop across the two flow resistances. The flow is decreased by less than one half of the percent change in the resistance of the viscosity piston, i. e., by less than the factor 1/1.045. Since the pressure drop across the viscosity piston is equal to the product of its flow resistance and the rate of flow, the new pressure drop ---
[1] The pressure drop across an aperture is a function of the velocity, Va squared, or $f(Va^2)$. If this is equated to $RaVa$ where $Ra$ is the aperture flow resistance, $f(Va^2)=RaVa$, and $Ra=f(Va^2)/Va$ and $Ra$ is seen to be a function of the flow velocity, decreasing as the flow velocity increases.

across the viscosity piston would be greater than its former value by more than 1.09(1/1.045)=1.045 approximately, or in increased pressure equals $$1.045 \times 25 - 25 = 1.2$$

pounds per square inch.

Since the valves and pistons are light, this force is able to produce the required correction in valves 17 in a few hundredths of a second.

The viscosity piston 33 has enough heat capacity to prevent appreciable change in temperature of the shower in the few hundredths of a second required for the valves 17 to correct the temperature of the mixed flow by a change in the relative amounts of hot and cold water passing through the valves 17. Thus, the instantaneous change in the coefficient of viscosity of the water, together with the quick acting valves and heat storage in the viscosity piston insure that the temperature of the shower shall remain close to the set value regardless of fluctuation in pressure and temperature of the supply lines.

The temperature regulator is constructed of simple, easily asembled parts. The case 11 with side inlets 12 and 13 for the cold and hot water is preferably a casting. In assembly the top cylinder 71 and bottom cap 42 are removed. The viscosity piston 33 slides or support rods 77 which connect the aperture ring 30 to the ring 85 which supports the ends of the valve vane axle 18, and in turn the ring 85 is connected by said rods 77 to the plate 73 (solder or weld). The partition 14 is also carried by the plate 73 and in turn mounts the bearings 19 for the central portion of the valve axle 18 and sprocket wheel 20. The viscosity piston 33, aperture 23, valves 17, and partion 14 are thus, held by rods 77 in the proper position with respect to plate 73. This assembly can be pulled into case 11 from the bottom by wires 70 connected to the ends of bolts 74 and pulled up through the openings for bolts 74 in the top of case 11, the gasket 76 making a water tight seal. The wire 23 is pulled out through the opening 86 in the top of case 11 and out through a hole in the piston 24 at position 35, and is kept taut to prevent sprocket chain 21 from possibly leaving the teeth of sprocket wheel 20. When the inner assembly has been properly positioned wire 23 is soldered or welded at position 35. The lever 52 may then be inserted through stuffing box 54 to key with axle 51. The cylinder 71 was previously removed for assembly of the reference piston 24. The rubber sleeve 34 is slipped inside the metal ring 75 attached to the bottom of cylinder 24. A pair of pliers is then used to squeeze the projections 83, see Fig. 2, of the clamping ring 38 together for insertion inside the rubber sleeve 34 at the bottom of piston 24. When the projections 83 are released the ring 38 expands and locks the upper end of rubber sleeve 34 against the inside of ring 75. In a similar manner ring 39 with projections 84 is used as a clamp immediately below ring 38 to prevent leakage past the projections 83 of the upper ring 38. The piston 24 and attached rubber sleeve 34 are now inserted in cylinder 71, the rods 40 extending up through the top of cylinder 71 and the stops 87 being attached by set screws. The piston 24 makes only a sliding fit with cylinder 71 and does not need accurate machining. The bottom end of sleeve 34 is placed adjacent to the bottom of cylinder 71, and clamp rings 16 and 16a are inserted to hold the lower end of sleeve 34 securely to the bottom of sleeve 71 in a similar maner to the action of rings 38 and 39 at the top of sleeve 34. As previously described the wire 23 is now threaded through a hole at 35 in piston 24. The flange ring on the bottom of cylinder 71 is now placed over bolts 74 and bolted down against gasket 72 for a water proof seal. The wire 23 is adjusted to a marked position at the top of piston 24 and soldered or welded at 35.

No accurate machining is required for the viscosity piston 33 as it can tolerate a clearance at the wall equal to the separtion of its internal parallel plates. The aperture vane 28a of the vane 28 makes only a loose fit in the aperture opening of ring 30, and the vanes 17a and 17b of the valves 17 do not need an accurate fit of the pipe channel to either side of the partition 14 as they are not required to completely cut off the flow of water when closed, and the piston 24 needs only a sliding fit as the rubber sleeve 34 makes a stretchable and foldable water proof seal between the bottom of cylinder 71 and the ring 75 attached to piston 24. No maintenance is required as the stuffing box packing 54 only has wear when the shower temperature setting is changed, and the openings between plates in the viscosity piston are self cleaning due to the high velocity of the water through them. The silicon rubber sleeve 34 does not deteriorate appreciably with time. In its average position it is under little tension, and in its maximum upward position is not stretched enough to seriously affect its elastic properties. When the piston 24 moves below its average position, rubber sleeve 34 merely collapses inward with little resistance to the downward motion of piston 24.

It is claimed and desired to secure by Letters Patent:

1. In an automatic temperature regulator for liquids, the combination of a pressure actuated control system, consisting of a temperature change detector comprised of a piston with slit passageways for the flow of liquid between parallel surfaces separated by spacers so that the change in the coefficient of viscosity caused by liquid temperature variations will produce corresponding changes in the pressure drop across said piston, a reference piston acted upon by the same pressure as that in series on said temperature change detector piston and a variable aperture, a connection between said pistons, vane valves actuated by said connection when said pistons are displaced by a difference in the forces acting on them so as to change the relative flow of hot and cold water into the mixer channel where the discharged liquid is to be kept at the desired reference value, and a variable aperture in series with the flow through said temperature change detector piston so that the forces acting on said reference and temperature change detector pistons can be balanced at the desired reference temperature.

2. In an automatic temperature regulator for liquids, a pressure actuated control system comprised of a mixing fluid channel with hot and cold liquid inlets, containing a temperature change detector comprised of a piston with split passageways separated by spacers so that the change in viscosity coefficient caused by liquid temperature variations will produce corresponding changes in the pressure drop across said piston for the same rate of flow, a variable aperture in said mixing channel in series with the flow through said temperature change detector piston for setting the force acting on said piston for a desired mixed liquid temperature, a reference piston sliding in a cylinder with openings to the atmosphere, a duct connecting said cylinder to said mixed fluid channel at a point where the pressure available is the total pressure head acting on said detector piston and said variable aperture in series, a mechanical connection between said detector piston and said reference piston, balanced vane valves in said cold and hot liquid inlets to maintain the temperature of the mixed fluid outlet unaffected by line pressure changes.

3. In an automatic temperature regulator for liquids, a temperature actuated control system comprised of, a mixing fluid channel with hot and cold fluid inlet channels, a temperature detector in said mixing channel comprised of a piston slidable in said mixing channel and conprised of slit passageways for the flow of liquid between parallel surfaces separated by spacers so that the changes in the viscosity coefficient caused by mixed fluid temperature variations will produce corresponding changes in the pressure across said detector piston for the same rate of flow, a variable aperture in said mixing channel in series with the flow through said detector piston consisting of a rotatable vane, an axle mounting said vane, a lever exterior to the mixing channel of said regulator that engages the end of said axle through a stuffing box for adjustment by pointer and scale indication means to permit setting the relative position of said variable aperture, a reference piston slidable in a cylinder in said regulator, a mechanical connection between said reference and detector pistons, valves in said hot and cold inlet channels actuated by said connection when said pistons are displaced by unbalanced forces to change the relative flow of hot and cold liquid through said valves, a duct leading from said reference piston cylinder to a position sampling the pressure in said mixing channel before the liquid passes through said variable aperture and detector piston, openings between said duct and the liquid flow at said point of sampling whose cross-sectional areas are in planes parallel to the liquid flow to insure that said reference piston will be acted upon by the same pressure as that incident upon said variable aperture and detector piston regardless of liquid momentum, so that changes in cold and hot inlet channel liquid pressures will not affect the response of said regulator.

4. In an automatic temperature regulator for liquids, a pressure actuated control system comprised of, a case with hot and cold inlet channels and a mixer channel outlet, a temperature change detector piston slidable in the mixer channel consisting of surfaces parallel to the stream flow with small clearance for the flow of liquid between them, so that for constant flow rate the pressure head on said detector piston changes with temperature produced variation in the coefficient of viscosity of the mixed fluid, a reference piston slidable freely in an extension of said case, a leakproof flexible sleeve attachment between said piston and a fixed support in said case extension, and ducting means connecting the cylinder of said reference piston to a point in the mixer channel of said case prior to liquid flow through said detector piston and a variable aperture, so that the pressures on said detector and reference pistons will be equal regardless of pressure fluctuations in said hot and cold fluid inlet channels, a mechanical connection between said reference and detector pistons, valves in said hot and cold inlet channels actuated by movement of said connection to vary the relative flow of hot and cold liquid through them, a variable aperture in said regulator case in series with the flow through said detector piston for producing equilibrium between said pistons for a given liquid temperature in said mixer outlet, consisting of a rotatable vane, an axle that mounts said vane, bearings for said axle, a split ring support for said bearings, a lever that passes through a stuffing box in said case and engages said axle, and indicating and positioning means for controlling the setting of said lever.

5. In an automatic temperature regulator for liquids, a pressure actuated control system consisting of, a case with hot and cold inlet channels and a mixing channel outlet, a temperature change detector piston in said mixing channel comprised of a cylinder containing narrow, slit passages for the flow of fluid so that the pressure head on said piston changes with variation in the coefficient of viscosity of the liquid caused by temperature change for the same rate of flow, an allowable clearance between the outer surface of said cylinder and said case up to but not exceeding the narrow dimension of said slit passages, a reference piston slidable in an extension of said case, duct means connecting said case extension to a point on the mixing channel that samples the pressure before the fluid flows through said detector piston and a variable aperture so that fluctuation in supply line pressure will produce the same percent change in pressure on said detector and reference pistons, a flexible sleeve connection between said reference piston and said case extension to prevent leakage, a mechanical connection between said reference piston and said temperature change detector piston, valves in said hot and cold inlet channels actuated by the movement of said connection that vary the relative flow of hot and cold fluid, a variable aperture in series with the flow through said temperature change detector piston for producing equilibrium between said pistons for a given liquid temperature at the mixing channel outlet, consisting of a rotatable vane, an axle that mounts said vane, bearings for said axle, a split ring support for said bearings, a lever that passes through a stuffing box in said case and engages said axle, and indicating and positioning means for controlling the position of said lever.

6. In an automatic temperature regulator for liquids, a pressure actuated control system comprised of a case with cold and hot liquid inlet channels and a mixing exit channel, a temperature change detector piston containing slit passageways for the flow of liquid so that change in the coefficient of viscosity of a liquid with temperature will change the pressure head on said liquid for the same rate of flow, a reference piston slidable in an extension of said case, duct means between said extension and said mixing channel at a point prior to the flow through said detector piston and a variable aperture so as to maintain the same percent change in pressure on said pistons due to supply line variations, a mechanical connection between said pistons comprised of a sprocket chain and springs in tandem, rotary valves actuated by said mechanical connection that vary the relative flow of cold and hot liquid through said cold and hot liquid inlet channels, vanes of said valves balanced about a common axle that carries a sprocket wheel driven without slippage by said sprocket chain, said sprocket chain being held against said sprocket wheel by said springs when the liquid is turned off, a variable aperture in series with the flow through said detector piston for producing equilibrium between said pistons for a desired temperature, and adjustment and indicating means for controlling the relative position of said variable aperture.

References Cited in the file of this patent

UNITED STATES PATENTS

| | | |
|---|---|---|
| 1,236,431 | Hawley | Aug. 14, 1917 |
| 1,455,633 | Lundgaard | May 15, 1923 |
| 1,545,956 | Good | July 14, 1925 |
| 2,010,837 | Albersheim et al. | Aug. 13, 1935 |
| 2,353,149 | Cram | July 11, 1944 |
| 2,449,766 | Brown | Sept. 21, 1948 |
| 2,697,554 | Kendig | Dec. 21, 1954 |